US008322872B2

(12) United States Patent
Cui et al.

(10) Patent No.: US 8,322,872 B2
(45) Date of Patent: Dec. 4, 2012

(54) LINEAR LIGHT DIFFUSING STRUCTURE FOR DOCUMENT SCANNERS

(75) Inventors: Chengwu Cui, Lexington, KY (US); David Keith Jackson, Lexington, KY (US); Joshua Tyler Strow, Lexington, KY (US)

(73) Assignee: Lexmark International, Inc., Lexington, KY (US)

( * ) Notice: Subject to any disclaimer, the term of this patent is extended or adjusted under 35 U.S.C. 154(b) by 510 days.

(21) Appl. No.: 12/577,927

(22) Filed: Oct. 13, 2009

(65) Prior Publication Data

US 2011/0044036 A1 Feb. 24, 2011

Related U.S. Application Data

(60) Provisional application No. 61/235,530, filed on Aug. 20, 2009.

(51) Int. Cl.
*F21V 33/00* (2006.01)
*F21V 29/00* (2006.01)
*H04N 1/04* (2006.01)

(52) U.S. Cl. ..... 362/89; 362/294; 362/373; 362/217.05; 358/482

(58) Field of Classification Search .................... 362/89, 362/294, 373, 235, 249.02, 217.05, 362; 358/482
See application file for complete search history.

(56) References Cited

U.S. PATENT DOCUMENTS

| | | | | |
|---|---|---|---|---|
| 6,229,137 | B1 * | 5/2001 | Bohn | 250/234 |
| 7,543,966 | B2 * | 6/2009 | Branson et al. | 362/346 |
| 7,591,576 | B2 * | 9/2009 | Okamoto et al. | 362/582 |
| 7,600,908 | B2 * | 10/2009 | Chang et al. | 362/623 |
| 7,784,975 | B2 * | 8/2010 | Krebs et al. | 362/296.01 |
| 7,924,478 | B2 * | 4/2011 | Kim et al. | 358/484 |
| 7,973,983 | B2 * | 7/2011 | Lin et al. | 358/484 |
| 8,059,147 | B2 * | 11/2011 | Taira et al. | 347/241 |
| 8,109,651 | B2 * | 2/2012 | Chen | 362/249.02 |
| 8,197,105 | B2 * | 6/2012 | Yang | 362/346 |

* cited by examiner

*Primary Examiner* — Peggy A. Neils
(74) *Attorney, Agent, or Firm* — John Victor Pezdek

(57) ABSTRACT

A tubular structure with an opening defined thereon and having an inner surface and an outer surface. The tubular structure being substantially circular in shape and is made of a highly thermal conductive material. A plurality of light sources mounted on the inner surface of the tubular structure. The inner surface is coated with a diffused white coating. Light emitted from the plurality of light sources is reflected from the inner surface before exiting the tubular structure from the opening. This structure ensures emitting a uniform diffused light and prevents non-uniform illumination when disposed in an imaging forming device.

21 Claims, 3 Drawing Sheets

LINEAR LIGHT DIFFUSING STRUCTURE FOR DOCUMENT SCANNERS

CROSS REFERENCES TO RELATED APPLICATIONS

This patent application is related to and claims benefit from U.S. Patent Application Ser. No. 61/235,530, filed Aug. 20, 2009, entitled "Imaging Device and Method of Making and Operating Same" and assigned to the assignee of the present application, the content of which is hereby incorporated by reference herein in its entirety.

BACKGROUND

1. Field of the Invention

The present invention relates generally to image forming devices, and particularly to scanners and scanning methods. More specifically, the present invention discloses a linear light diffusing structure to form a substantially uniform light output beam for illuminating a media sheet when placed on an imaging surface.

2. Description of the Related Art

Scanners are used to scan an image from a sheet of media and create scanned image data which can be displayed on a computer monitor, printed, sent via facsimile transmission, etc. Scanned image data may be saved in memory or a magnetic or optical drive, or other memory device. Scanning devices may be packaged in a stand-alone housing or as a part of a multi-functional product, including a product having a printing component, to perform scanning as well as standard copying functions.

In a conventional scanner, the desire to use light emitting diodes (LEDs) as a light source for scanner is not new. LEDs are mercury free, instant-on and compact. However there are a few factors that hinder the use of LEDs in a high speed document scanner. The top hindering factors are cost and output intensity. With the rapid advancement in research, development and manufacturing of LEDs, cost and output performance are reaching acceptable levels and therefore there is the renewed interest in using high powered LEDs as the illumination source for high speed documents scanners. In addition to cost and output level, there are additional factors that often need to be carefully controlled. One is thermal stability. The inherent nature of a small LED chip outputting a high intensity light presents challenges to dissipate heat efficiently so that the LED is not thermally affected both in output intensity and spectral composition to negatively impact scan image quality. Another factor is the non-uniformity of the light profile when a limited number of LEDs are used to save cost. Since the LED's light emitting PN junction is usually small, the light output profile can be highly irregular and difficult to control even with elaborate lens designs which disadvantageously increases cost.

Given the foregoing, it would be desirable therefore to provide a substantially thermally stable, light generating structure which provides a substantially uniform light output for a scanning device.

SUMMARY OF THE INVENTION

Embodiments of the present invention overcome shortcomings of prior lighting devices and thereby satisfy a significant need for a thermally stable lighting device that generates a substantially uniform light profile. According to an exemplary embodiment of the present invention, there is provided an image forming device that includes an imaging surface for supporting a media sheet; a substantially tubular structure having an opening defined thereon, the tubular structure being disposed in proximity to the imaging surface; and a plurality of light sources mounted on an inner surface of the tubular structure for illuminating the media sheet when placed on the imaging surface such that light emitted from the plurality of light sources is reflected from the inner surface before exiting the tubular structure through the opening as diffused light. The diffused light generated is reflected off the media sheet and captured by a sensing unit for use in generating an image of the media sheet.

In some embodiments, the cross section of the tubular structure is substantially circular in shape.

In another embodiment, the opening of the tubular structure has a width of about 40% of the inner diameter of the tubular structure.

In yet another embodiment, the tubular structure includes plurality of heat dissipating fins extending from an outer surface of the tubular structure.

In yet another aspect of the invention, a tubular structure is disclosed that includes an opening defined therein, a plurality of light sources mounted on an inner surface, the tubular structure having a density of light sources at end portions that is greater than the light source density at other portions of the tubular structure.

In another embodiment, the tubular structure is made up of a thermally conductive material.

BRIEF DESCRIPTION OF THE DRAWINGS

The above-mentioned and other features and advantages of the various embodiments of the invention, and the manner of attaining them, will become more apparent will be better understood by reference to the accompanying drawings, wherein.

DETAILED DESCRIPTION

Figure 1:
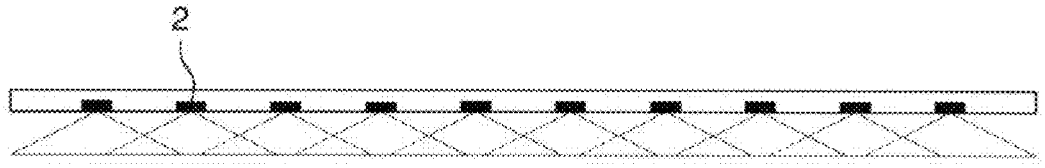
FIG. 1 PRIOR ART
FIG. 1 is a perspective view of a light profile of a known arrangement of LEDs.

It is to be understood that the invention is not limited in its application to the details of construction and the arrangement of components set forth in the following description or illustrated in the drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings. In addition, the terms "connected" and "coupled" and variations thereof are not restricted to physical or mechanical connections or couplings.

Reference will now be made in detail to the exemplary embodiment(s) of the invention, as illustrated in the accompanying drawings. Whenever possible, the same reference numerals will be used throughout the drawings to refer to the same or like parts.

FIG. 1 illustrates an exemplary light profile from a known arrangement of LEDs. When a limited number of LEDs 2 are placed together to illuminate a media sheet, the light profile is non-uniform due to LEDs inherently emitting non-uniform light and to the overlapping and non-overlapping areas of light from the row of LEDs 2. The arrangement is difficult to compensate when impacted by thermal changes. Further, there is also a problem of safety if the end user looks at the LEDs 2 for a prolonged period of time.

Figure 2:
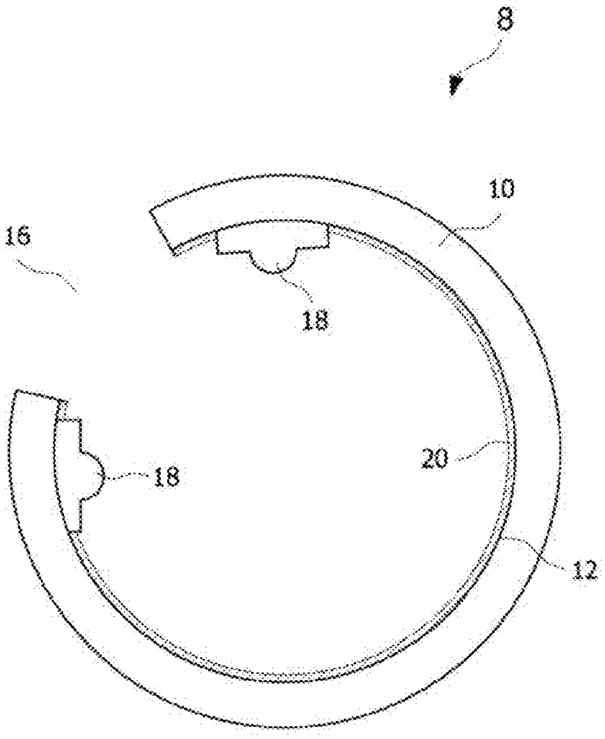
FIG. 2 is a schematic view of a lighting device according to an embodiment of the present invention.

FIG. 2 illustrates an embodiment of a lighting device 8. Lighting device 8 may include a substantially cylindrical tubular structure 10 having a slot or opening 16 and a plurality of light sources 18 mounted on inner surface 12 of tubular structure 10. In general terms, light generated by light sources 18 is reflected from inner surface 12 of tubular structure 10 and exits through opening 16 as diffused light. The diffused light exiting tubular structure 10 is seen to have a substantially uniform profile.

Tubular structure 10 may be made from a thermally conductive material, such as, aluminum or copper. The thermally conductive material effectively dissipates heat generated by light sources 18. The heat transfer may be further increased by the addition of a small fan (not shown) disposed at one end of tubular structure 10 and an air duct defined at an opposed end of tubular structure 10 so as to create airflow therein. This increases the convective heat transfer that further aids in keeping the light sources 18 cool and therefore thermally stable.

As mentioned above, the tubular structure 10 has an opening 16 to allow light from a plurality of light sources 18, mounted on the inner surface 12 of the tubular structure 10, to exit tubular structure 10 as diffused light. Opening 16 may be defined substantially entirely along tubular structure 10 in a longitudinal direction thereof. Opening 16 may have a width of about 30% to about 60% of the inner diameter of tubular structure 10, such as about 40%. In other words, the angular width of opening 16 may be between about 35 degrees and about 70 degrees, such as about 45 degrees, relative to a center of tubular structure 10.

Inner surface 12 of tubular structure 10 may be coated with a diffuse white coating 20 of a relatively high level of reflectance. The diffused white coating 20 may be formed as a flexible film, liner or other material that is detachable from the tubular structure 10. Alternatively, coating 20 may be painted onto inner surface 12 of tubular structure 12 and be fixed thereon. Coating 20 serves to diffuse light incident thereto.

The plurality of light sources 18 may be arranged along inner surface 12 of tubular structure 10. In accordance with an embodiment of the present invention, light sources 18 are LEDs, but it is understood that alternatively other light sources may be utilized having an appropriate size to fit within the tubular structure 10. Light sources 18 may be arranged along tubular structure 10 so that light from each light source 18 is reflected multiple times before exiting opening 16 of the tubular structure 10. Such multiple light reflections allows for light exiting tubular structure 10 to be diffused and substantially uniform.

Figure 3:
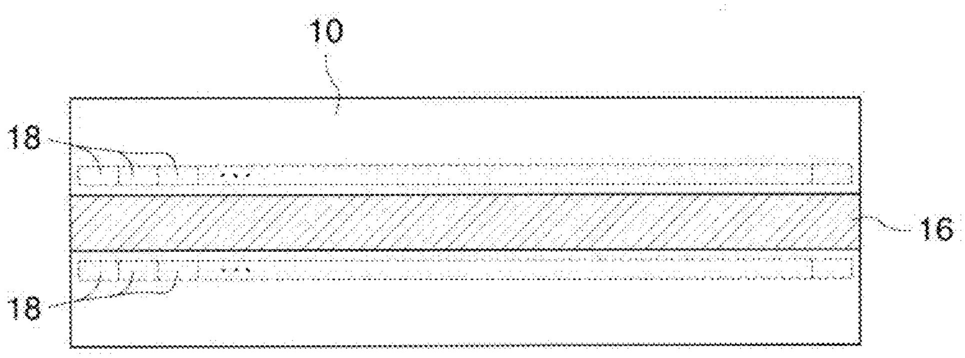
FIG. 3 is a side schematic view of the lighting device of FIG. 1.

Light sources 18 may be disposed in one or more rows along inner surface 12 of tubular structure 10 in a longitudinal direction thereof. According to an embodiment of the present invention, the one or more rows of light sources 18 may be disposed on inner surface 12 proximal to opening 16, such as in two rows proximal to each longitudinal edge of opening 16 as shown in FIGS. 2 and 3. In this way, light emitted from light sources 18 is directed towards the central, inner volume of tubular structure 10, thereby ensuring that light exiting from tubular structure 10 through opening 16 is diffused and substantially uniform. To further ensure that exiting light has little if any direct light, baffles 26 (seen in the embodiment of FIG. 4) may extend from inner surface 12 of tubular structure 10 between light sources 18 and opening 16 so as to substantially block direct light from exiting tubular structure 10.

The generally circular cross-sectional shape of the tubular structure 10 allows different mounting patterns of the plurality of light sources 18 depending upon the characteristics of the light sources used. Accordingly, fewer rows and/or fewer light sources per row may be needed with light sources 18 having higher output as opposed to light sources 18 having lower output. The circular cross-sectional shape of tubular structure 10 thereby allows flexibility in the selection of light sources 18.

The circular cross-sectional shape of the tubular structure 10 also allows for altering the density of light sources 18 along tubular structure 10. For example, a greater number of light sources 18 can be used towards the two ends of the tubular structure 10 relative to the number of light sources 18 at a central portion thereof in order to compensate for any lens vignette effect.

Figure 4:
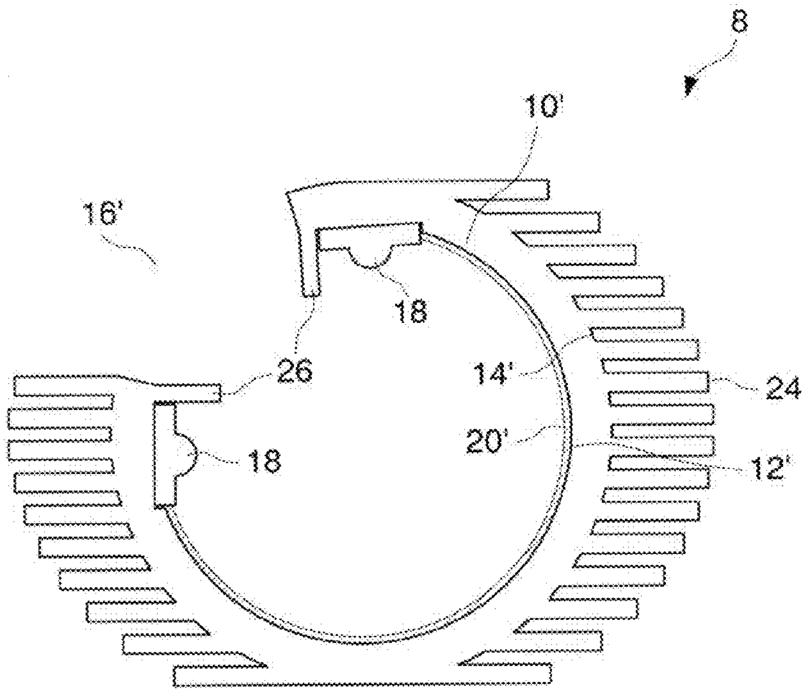
FIG. 4 is a schematic view of an alternative embodiment of the lighting device with a plurality of fins disposed on an outer surface.

Another embodiment of lighting device 8 is illustrated in FIG. 4. Similar to tubular structure 10, tubular structure 10' may have a substantially circular cross-sectional shape, an inner surface 12' and an outer surface 14'. The tubular structure 10' may include opening 16' and plurality of light sources 18, such as one or more rows of LEDs mounted on the inner surface 12' of the tubular structure 10' proximal to opening 16. The inner surface 12' of the structure may include a white diffused coating 20'. Like lighting device 8 of FIGS. 2 and 3, light sources 18 of the lighting device 8 of FIG. 4 emit light towards a central portion of tubular structure 10' so that light exiting opening 16' is diffused light that has been reflected from coating 20' of inner surface 12'. Baffles 26 extend from inner surface 12' and serve to prevent direct light generated by light sources 18 from exiting tubular structure 10' through opening 16'. Baffles 26 are generally rectangular in shape and have flat planar surfaces that are positioned substantially orthogonal to light sources 18. Baffles 26 extend inwardly into tubular structure 10' beyond light sources 18 and the flat planar surfaces thereof block direct light generated by light sources 18 from exiting through opening 16' so that only the diffused light reflected from coating 20' of inner surface 12' exits opening 16' of the tubular structure 10'.

According to an embodiment of the present invention, a plurality of fins 24 may extend outwardly from outer surface 14' of tubular structure 10'. Fins 24 may be integrally formed with tubular structure 10' so as to form a unitary member therewith. With tubular structure 10' and fins 24 being formed from a heat conductive material, such as aluminum or copper, tubular structure 10' and fins 24 form an effective heat sink to dissipate heat generated by light sources 18. Though FIG. 4 shows fins 24 extending from tubular structure 10' in substantially parallel, horizontal directions, it is understood that alternatively fins 24 may extend in different directions, such as extending radially outwardly from tubular structure 10' (not shown).

Figure 5:
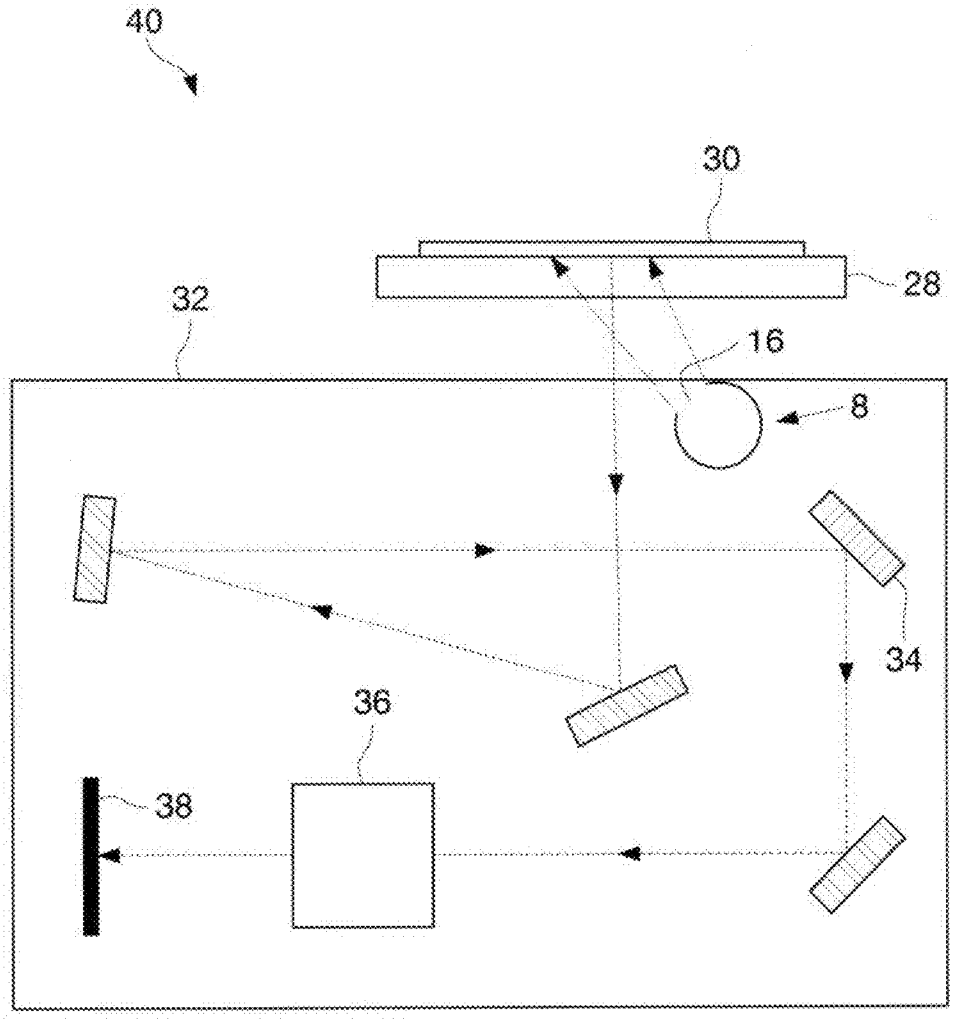
FIG. 5 is a cross section view of an image scanning apparatus with the lighting device disposed therein.

FIG. 5 illustrates a schematic view of an image forming apparatus 40 utilizing a lighting device 8 according to embodiments of the present invention. Image forming apparatus 40 may include a transparent surface 28 on which a sheet of media 30 is disposed. Image forming apparatus 40 may further include a scan module 32 which is disposed relative to surface 28 and configured to direct light towards media sheet 30 and capture light reflected therefrom. In one embodiment, light is only directed to a portion of media sheet 30 at a time. Accordingly, image forming apparatus 40 may include a motion mechanism, including a motor (now shown), for moving scan module 32 relative to media sheet 30 so as to capture light reflected from the entire surface of media sheet 30. In this way, an electronic image of the entire media sheet may be captured during a scan operation.

Lighting device 8 is disposed in scan module 32 in proximity to surface 28 and oriented so that diffused light exiting from opening 16 of tubular structure 10 is directed towards media sheet 30. Scan module 32 may further include a plurality of mirrors 34 which reflect light deflected from media sheet 30. Light reflected from mirrors 34 may be focused by at least one lens assembly 36 so that the focused light is directed onto the surface of image sensors 38. The light sensed by sensors 38 may be used to recreate the image of media sheet 30, as is known in the art.

It will be apparent to those skilled in the art that various modifications and variations can be made to the present invention without departing from the spirit and scope of the invention. Thus it is intended that the present invention cover the modifications and variations of this invention provided they come within the scope of the appended claims and their equivalents.

What is claimed is:

1. An image forming device, comprising:

an imaging surface for supporting a media sheet;

a substantially tubular structure having a longitudinal opening thereon, the tubular structure being disposed in proximity to the imaging surface;

at least one baffle having a planar surface mounted along an edge of the opening, the at least one baffle extending inwardly into the tubular structure;

a plurality of light sources mounted on an inner surface of the tubular structure immediately adjacent the planar surface of the baffle with the planar surface of the baffle being positioned substantially orthogonal to the plurality of light sources, the plurality of light sources for illuminating the media sheet when placed on the imaging surface such that light emitted from the plurality of light sources is reflected from an inner surface of the tubular structure before exiting the tubular structure through the opening as diffused light with the planar surface of the at least one baffle blocking light from the plurality of light sources from directly exiting through the opening; and an imaging member disposed relative to the imaging surface for capturing light reflected from the media sheet so as to form an image thereof.

2. The imaging device according to claim 1, wherein a cross section of the tubular structure is substantially circular in shape.

3. The imaging device according to claim 1, wherein the tubular structure has an inside diameter and the opening of the tubular structure has a width between about 30% and about 60% of the inside diameter.

4. The imaging device according to claim 1, wherein the opening of the tubular structure forms an angle between about 35 degrees and about 70 degrees from a center of the tubular structure.

5. The imaging device according to claim 1, further comprising a plurality of heat dissipating fins extending from an outer surface of the tubular structure.

6. The imaging device according to claim 1, wherein a density of light sources at end portions of the tubular structure is greater than light source density at other portions of the tubular structure.

7. The imaging device according to claim 1, wherein the imaging member includes a lens directed at the imaging member.

8. The imaging device according to claim 2, wherein the tubular structure is made up of a thermally conductive material.

9. The imaging device according to claim 1, wherein the inner surface of the tubular structure is coated with a diffuse coating.

10. The imaging device according to claim 1, wherein the plurality of light sources comprise light emitting diodes.

11. A lighting device for a scanning device, comprising:

a substantially tubular structure having a longitudinal opening defined thereon;

at least one baffle having a planar surface mounted along an edge of the opening, the at least one baffle extending inwardly into the tubular structure; and a plurality of light sources mounted on an inner surface of the tubular structure immediately adjacent the planar surface of the baffle, the planar surface being substantially orthogonal to the plurality of light sources such that light emitted from the plurality of light sources is reflected from an inner surface of the tubular structure before exiting the tubular structure through the opening as diffused light with the planar surface of the at least one baffle blocking light from the plurality of light sources from directly exiting through the opening.

12. The lighting device according to claim 11, wherein the plurality of light sources are light emitting diodes (LEDs), the LEDs disposed along the at least one edge of the opening so as to direct light towards a center of the tubular structure.

13. The lighting device according to claim 11, wherein the tubular structure is made of a thermally conductive material.

14. The lighting device according to claim 11, wherein the tubular structure further comprises a plurality of heat dissipating fins extending from an outer surface.

15. The lighting device according to claim 11, wherein the tubular structure has an inside diameter and the opening of the tubular structure has a width between about 30% and about 60% of the inside diameter.

16. The lighting device according to claim 11, wherein a density of the light sources at one or more end portions of the tubular structure is greater than a density of the light sources at other portions of the tubular structure.

17. The lighting device according to claim 11, wherein the inner surface of the tubular structure is coated with a diffuse coating.

18. The imaging device according to claim 1, wherein the plurality of light sources are aligned into one or more rows.

19. The imaging device according to claim 1, wherein the plurality of light sources are disposed along the at least one edge of the opening to focus light towards a center of the tubular structure such that diffused light reflected from the inner surface thereof exits from the opening in a substantially uniform manner.

20. The lighting device according to claim 11, wherein the plurality of light sources are disposed along the at least one edge of the opening to focus light towards a center of the tubular structure such that diffused light reflected from the inner surface thereof exits from the opening in a substantially uniform manner.

21. The lighting device according to claim 11, wherein the planar surface of the at least one baffle is substantially rectangular in shape.

* * * * *